United States Patent [19]
Bonoyer et al.

[11] Patent Number: 6,067,505
[45] Date of Patent: May 23, 2000

[54] METHOD AND APPARATUS FOR SELF-CALIBRATION OF A COORDINATED CONTROL SYSTEM FOR AN ELECTRIC POWER GENERATING STATION

[75] Inventors: John J. Bonoyer, Harrisville, R.I.; Todd J. Flanagan, Clinton, Mass.

[73] Assignee: The Foxboro Company, Foxboro, Mass.

[21] Appl. No.: 09/058,502

[22] Filed: Apr. 10, 1998

Related U.S. Application Data

[60] Provisional application No. 60/043,164, Apr. 10, 1997.

[51] Int. Cl.[7] ....................................................... G21C 7/36
[52] U.S. Cl. ............................ 702/85; 702/184; 706/52; 706/60
[58] Field of Search ............... 702/85, 184; 364/528.28, 364/138; 706/52, 60

[56] References Cited

U.S. PATENT DOCUMENTS

| | | | |
|---|---|---|---|
| 4,027,145 | 5/1977 | McDonald et al. | 364/528.28 |
| 4,853,175 | 8/1989 | Book, Sr. | 364/525.28 |
| 5,132,920 | 7/1992 | Bellows et al. | 702/184 |
| 5,493,729 | 2/1996 | Nigawara et al. | 706/52 |

*Primary Examiner*—Marc S. Hoff
*Assistant Examiner*—Hien Vo
*Attorney, Agent, or Firm*—Lahive & Cockfield, LLP

[57] ABSTRACT

A method of calibrating a multivariate controller in a coordinated control system of an electric power generating station includes an expert system for collecting data at a plurality of operating parameters of the power generating system and providing that data to a characterizer block. By using the calibration data, which is predictive of the response of the power generating system to an external disturbance, the characterizer block provides a feedforward signal to the multivariate controller before the effect of the external disturbance can propagate throughout the power generating system. In the method of the invention, the expert system is implemented as a spreadsheet with a DDE interface to the power generating system and an automatic script file generator for communicating to the characterizer block.

29 Claims, 14 Drawing Sheets

| CUSTOMER | SALT RIVER PROJECT | | | Unit | 3 | |
|---|---|---|---|---|---|---|
| STATION | NAVAJO STATION | | | Date | 5/8/97 | |
| | All load data is to be taken in 10% increments at stable load with normal equipment in service. At each load point SH, RH and O2 must be at their desired values. | | | | | |
| | | | | | | |
| LOAD | | GROSS | 1st STG | THR | TUR VLV. | TOTAL | TOTAL |
| DATA | | MW | PRESS | PRESS | DMD | FUEL | AIR |
| POINTS | | MW | PSIG | PSIG | % | % | % |
| | 1 | 56.15 | 233.09 | 863.87 | 32.48 | 9.49 | 32 |
| RAMP | 2 | 90.44 | 312.66 | 1989.9 | 33.68 | 14.29 | 32 |
| | 3 | 110.19 | 377 | 2065.6 | 37.7 | 15.44 | 33.25 |
| | 4 | 110.19 | 377 | 2065.6 | 37.7 | 15.44 | 33.25 |
| | 5 | 235.65 | 744.55 | 3500 | 42.62 | 31.1 | 32.18 |
| | 6 | 241.86 | 772.9 | 3503 | 41.6 | 31.75 | 32 |
| | 7 | 260.37 | 841.11 | 3511.8 | 43.46 | 34.61 | 35.3 |
| | 8 | 260.37 | 841.11 | 3511.8 | 43.46 | 34.61 | 35.3 |
| | 9 | 407.7 | 1253.7 | 3518 | 47.1 | 42.14 | 41.74 |
| FULL | 10 | 510 58 | 1589.4 | 3499.7 | 60.32 | 52.28 | 51.89 |
| PRESS | 11 | 610.29 | 1922.5 | 3491.8 | 73.51 | 63.14 | 63.05 |
| | 12 | 800 | 2617.9 | 3500.9 | 100 | 88.6 | 94.88 |
| | 13 | 800 | 2617.9 | 3500.9 | 100 | 88.6 | 94.88 |
| | 14 | 800 | 2617.9 | 3500.9 | 100 | 88.6 | 94.88 |
| WOV | 15 | 800 | 2617.9 | 3500.9 | 100 | 88.6 | 94.88 |
| FULLP | 16 | 800 | 2617.9 | 3500.9 | 100 | 88.6 | 94.88 |
| OVRP | 17 | 798.3 | 2595.3 | 3614.6 | 95.77 | 87.54 | 86.37 |
| REDP | 18 | 800 | 2617.9 | 3500.9 | 100 | 88.6 | 94.88 |
| | LOAD POINTS 1-5 ARE TAKEN DURING THE PRESSURE RAMP. | | | | | | |
| | LOAD POINTS 6-14 ARE TAKEN AT FULL RATED THROTTLE PRESSURE. | | | | | | |
| | LOAD POINT #15 IS AT FULL PRESSURE WIYH TURBINE VALVES WIDE OPEN. | | | | | | |
| | LOAD POINT #16 IS TAKEN AT FULL PRESSURE AND 75% LOAD. | | | | | | |
| | LOAD POINT #17 IS TAKEN AT NORMAL OVER PRESSURE AND 75% LOAD. | | | | | | |
| | LOAD POINT #17 IS TAKEN AT NORMAL REDUCED PRESSURE AND 75% LOAD. | | | | | | |

*FIG. 3*
(PART I)

| LOAD DATA POINTS | | TOTAL FW FLW KPPH | OXYGEN %O2 | ECON IN TEMP DEG F | WWO TEMP DEG F | PRI SH TEMP DEG F | DSH OTIT TEMP DEG F |
|---|---|---|---|---|---|---|---|
| | 1 | 544.33 | 7.5 | | 787.5 | | |
| RAMP | 2 | 832.4 | 7.04 | | 808 | | |
| | 3 | 1006.7 | 7.03 | | 814.9 | | |
| | 4 | 1006.7 | 7.03 | | 814.9 | | |
| | 5 | 1681.2 | 5.08 | | 792.3 | | |
| | 6 | 1904 | 5.5 | | 789 | | |
| | 7 | 2062.8 | 5.4 | | 780 | | |
| | 8 | 2062.8 | 5.4 | | 780 | | |
| | 9 | 2745.3 | 4.11 | | 772.9 | | |
| FULL | 10 | 3383.4 | 3.67 | | 785.1 | | |
| PRESS | 11 | 4011.2 | 3.54 | | 790.4 | | |
| | 12 | 5411.8 | 3.36 | | 793.1 | | |
| | 13 | 5411.8 | 3.36 | | 793.1 | | |
| | 14 | 5411.8 | 3.36 | | 793.1 | | |
| WOV | 15 | 5411.8 | 3.36 | | 793.1 | | |
| FULLP | 16 | 5411.8 | 3.36 | | 793.1 | | |
| OVRP | 17 | 5385.8 | 3.26 | | 802.5 | | |
| REDP | 18 | 5411.8 | 3.36 | | 793.1 | | |

*FIG. 3*
(PART II)

| LOAD DATA POINTS | | SH OTIT TEMP DEG F | RH OTIT TEMP DEG F | BIR MSTR DEMAND % | LMCC DEMAND MW |
|---|---|---|---|---|---|
| | 1 | 927 | 925 | 9.09 | 60 |
| RAMP | 2 | 885.7 | 916 | 13.82 | 121.61 |
| | 3 | 901 | 930 | 16.45 | 144.76 |
| | 4 | 901 | 930 | 16.45 | 144.76 |
| | 5 | 978.31 | 832 | 28 | 246.4 |
| | 6 | 971 | 890 | 31.45 | 276.76 |
| | 7 | 956 | 890 | 34.6 | 290 |
| | 8 | 956 | 890 | 34.6 | 290 |
| | 9 | 980.51 | 905 | 45.63 | 400 |
| FULL PRESS | 10 | 1007.6 | 957 | 55.87 | 500 |
| | 11 | 1001.8 | 975 | 67.37 | 600 |
| | 12 | 1002.2 | 1011.7 | 90.89 | 800 |
| | 13 | 1002.2 | 1011.7 | 90.89 | 800 |
| | 14 | 1002.2 | 1011.7 | 90.89 | 800 |
| WOV | 15 | 1002.2 | 1011.7 | 90.89 | 800 |
| FULLP | 16 | 1002.2 | 1011.7 | 90.89 | 800 |
| OVRP | 17 | 996.63 | 1010.3 | 89.21 | 800 |
| REDP | 18 | 1002.2 | 1011.7 | 90.89 | 800 |

*FIG. 3*
(PART III)

Engineering Data

| Measurement | Low Range | High Range | Engineering Units | | C:B:P | | Current Value |
|---|---|---|---|---|---|---|---|
| Throttle Pressure | 0 | 5000 | PSIG | | 3CCM:B9.OUT | | 3502 |
| First Stage Pressure | 0 | 3000 | PSIG | | 3CCM:B13.OUT | | 2627.2 |
| Unit Gross Generation | 0 | 1000 | MW | | 3CCM:B7.PNT | | 796 |
| Unit Auxiliary Load | 0 | 80 | MW | | 3CCM:B8.PNT | | 0 |
| Fuel Flow | 0 | 100 | % | | 3TF:B51.MEAS | | 89.66 |
| Air Flow | 0 | 100 | % | | 3AF:B33.MEAS | | 89.27 |
| Feedwater Flow | 0 | 6000 | KPPH | | 3FW:B23.OUT | | 5484.9 |
| Oxygen | 0 | 7.5 | %O2 | | 3O2:B16.MEAS | | 3.1 |
| Economizer Inlet Temp | 0 | 600 | Deg F | | 3FW:B11.OUT | | 0 |
| Water Wall Outlet Temp | 0 | 900 | Deg F | | 3WWT:B4.OUT | | 793.9 |
| Primary SH Outlet Temp | 0 | 1000 | Deg F | | | | 0 |
| Desuperheater Outlet Temp | 0 | 1200 | Deg F | | | | 0 |
| Superheater Outlet Temp | 0 | 1200 | Deg F | | 3ISPR:B4.OUT | | 978.4 |
| Reheat Outlet Temp | 0 | 1200 | DegF | | 2RHA:B15.MEAS | | 982 |
| Boiler Master Demand | 0 | 100 | % | | 3BM:B43.OUT | | 91.77 |
| LMCC Demand | 0 | 1000 | MW | | 3UDL:B44.OUT | | 800 |
| | | | | | | | |
| PI/PT K Factor | | 133.73 | | | | | |
| | | | Char 1 | | 3ULD:B8 | | |
| | | | Char 2 | | 3ULD:B10 | | |
| | | | Char 3 | | 3BM:B23 | | |
| | | | Char 4 | | 3TC:B19 | | |
| | | | Char 5 | | 3TC:B34A | | |
| | | | Char 6 | | 3TC:B32 | | |
| | | | Char 7 | | 3TC:B16A | | |
| | | | Char 8 | | 3FM:B2 | | |
| | | | Char 9 | | 3FT:B9 | | |
| | | | Char 10 | | 3FT:B10 | | |

FIG. 4

|  | Gross MW | 1st Stg Press | Thr Press | Tur Vlv Dmd | Scaling Data Total Fuel | Total Air | Total FW Flw | Total FW Flw |
|---|---|---|---|---|---|---|---|---|
|  | MW | PSIG | PSIG | % | % | % | % | KPPH |
| Min | 0.0 | 0.0 | 0.0 | 0.0 | 0.0 | 0.0 | 0.0 | 0.0 |
| 1 | 56.2 | 233.1 | 863.9 | 32.5 | 9.5 | 32.0 | 9.1 | 544.3 |
| 2 | 90.4 | 312.7 | 1989.9 | 33.7 | 14.3 | 32.0 | 13.9 | 832.4 |
| 3 | 110.2 | 377.0 | 2065.6 | 37.7 | 15.4 | 33.3 | 16.8 | 1006.7 |
| 4 | 110.2 | 377.0 | 2065.6 | 37.7 | 15.4 | 33.3 | 16.8 | 1006.7 |
| 5 | 235.7 | 744.6 | 3500.0 | 42.6 | 31.1 | 32.2 | 28.0 | 1681.2 |
| 6 | 241.9 | 772.9 | 3503.0 | 41.6 | 31.8 | 32.0 | 31.7 | 1904.0 |
| 7 | 260.4 | 841.1 | 3511.8 | 43.5 | 34.6 | 35.3 | 34.4 | 2062.8 |
| 8 | 260.4 | 841.1 | 3511.8 | 43.5 | 34.6 | 35.3 | 34.4 | 2062.8 |
| 9 | 407.7 | 1253.7 | 3518.0 | 47.1 | 42.1 | 41.7 | 45.8 | 2745.3 |
| 10 | 510.6 | 1589.4 | 3499.7 | 60.3 | 52.3 | 51.9 | 56.4 | 3383.4 |
| 11 | 610.3 | 1922.5 | 3491.8 | 73.5 | 63.1 | 63.1 | 66.9 | 4011.2 |
| 12 | 800.0 | 2617.9 | 3500.9 | 100.0 | 88.6 | 94.9 | 90.2 | 5411.8 |
| 13 | 800.0 | 2617.9 | 3500.9 | 100.0 | 88.6 | 94.9 | 90.2 | 5411.8 |
| 14 | 800.0 | 2617.9 | 3500.9 | 100.0 | 88.6 | 94.9 | 90.2 | 5411.8 |
| WOV | 800.0 | 2617.9 | 3500.9 | 100.0 | 88.6 | 94.9 | 90.2 | 5411.8 |
| Max | 880.0 | 2902.4 |  | 110.9 | 98.2 |  | 100.0 | 6000.0 |

*FIG. 5*
(PART I)

|  | Oxygen | Econ In Temp | WWO Temp | Pri Sh Temp | Dsh Otl Temp | Sh Otlt Temp | Rh Otlt Temp | Blr Mstr Demand |
|---|---|---|---|---|---|---|---|---|
|  | %O2 | DEG F | DEG F | DEG F | DEG F | DEGF | DEG F | % |
| Min | 0.0 | 0.0 | 0.0 | 0.0 | 0.0 | 927.0 | 925.0 | 0.0 |
| 1 | 7.5 |  | 787.5 |  | 0.0 | 885.7 | 916.0 | 9.1 |
| 2 | 7.0 |  | 808.0 |  | 0.0 | 901.0 | 930.0 | 13.8 |
| 3 | 7.0 |  | 814.9 |  | 0.0 | 901.0 | 930.0 | 16.5 |
| 4 | 7.0 |  | 814.9 |  | 0.0 | 978.3 | 832.0 | 16.5 |
| 5 | 5.1 |  | 792.3 |  | 0.0 | 971.0 | 890.0 | 28.0 |
| 6 | 5.5 |  | 789.0 |  | 0.0 | 956.0 | 890.0 | 31.5 |
| 7 | 5.4 |  | 780.0 |  | 0.0 | 956.0 | 890.0 | 34.6 |
| 8 | 5.4 |  | 780.0 |  | 0.0 | 980.5 | 905.0 | 34.6 |
| 9 | 4.1 | 0.0 | 772.9 | 0.0 | 0.0 | 1007.6 | 957.0 | 45.6 |
| 10 | 3.7 | 0.0 | 785.1 |  | 0.0 | 1001.8 | 975.0 | 55.9 |
| 11 | 3.5 | 0.0 | 790.4 | 0.0 | 0.0 | 1002.2 | 1011.7 | 67.4 |
| 12 | 3.4 |  | 793.1 |  | 0.0 | 1002.2 | 1011.7 | 90.9 |
| 13 | 3.4 |  | 793.1 |  | 0.0 | 1002.2 | 1011.7 | 90.9 |
| 14 | 3.4 |  | 793.1 |  | 0.0 | 1002.2 | 1011.7 | 90.9 |
| WOV | 3.4 | 0.0 | 793.1 |  | 0.0 | 1002.2 | 1011.7 | 87.1 |
| Max |  |  |  |  |  |  |  | 100.8 |

*FIG. 5*
(PART II)

```
Sub MoveData (Row_Ptr As Integer)
   Range ("F4 : F19").Select
   Selection.Copy Sheets ("Load Data").Select
   Cells (Row_Ptr, first_col).Select
   If MsgBox("Copy Data?", 1) = 1 Then
      Selection.PasteSpecial Paste:=x1All, Operation:=x1None, SkipBlanks_
         :=False, Transpose:=True
   End If
End Sub
```

93 ⁄

```
Function GetIndex ( ) As Integer

Dim idx As Integer
Dim NextCell As Object

Set NextCell = ThisWorkbook.Worksheets("Load Data")

idx = 0

Do While NextCell.Cells(first_point + idx, first_col).Value < > " " _
   And NextCell.Cells(first_point + idx, first_col).Value < > 0# _
   And idx < Num_Rows - 1 idx = idx + 1

Loop

Get Index + first_point + idx

End Function
```

```
Sub GetChars ( )

Characterizer name and data locations
    Dim ScrFileName As String
    Dim idx As Integer
    Dim data_cell As Object
    Dim name_cell As Object
    Dim next_cell As Object
    Dim file_ptr As Integer Set data_cell = Sheets("Config Info").Cells(11, 3).
    Set name_cell = data_cell.Offset(0, -1)
    Set next_cell = data_cell.Offset(1, 0)
    ScrFileName = "c:\icc.scr"
    file_ptr = FreeFile()

Open ScrFileName For Output As file_ptr
    Print #file_ptr, "open blah all loadscript"

Do While Not IsEmpty(data_cell)
       WriteScript name_cell.Value, Range(data_cell.Formula), file_ptr
       Set next_cell = data_cell.Offset(1, 0)
       Set data_cell = next_cell
       Set name_cell = data_cell.Offset(0, -1)
    Loop Print #file_ptr, "close"
    Print #file_ptr, "exit"

Close file_ptr

MsgBox "API commands written in c:\icc.scr"

End Sub
```

*FIG. 9C*

```
Sub WriteScript(char_name As String, char_ref As Object, file_ptr As Integer)

Dim next_cell As Object
    Dim y_coord As Object
    Dim idx As Integer

Set next_cell = char_ref.Offset(1, 0)
    Set y_coord = char_ref.Offset(0, 1)
    idx = 1

Print #file_ptr, "MODIFY" & char_name
    Do While Not IsEmoty(char_ref)
        Print #file_ptr, "X_" & idx & " = " & char_ref.Value
        Print #file_ptr, "Y_" & idx & " = " & y_coord.Value
        Set next_cell = char_ref.Offset(1, 0)
        Set char_ref = next_cell
        Set y_coord = char_ref.Offset(0, 1)
        idx = idx + 1
    Loop
    Print #file_ptr, "ENDP = " & idx - 1
    Print #file_ptr, "END"

End Sub
```

METHOD AND APPARATUS FOR SELF-CALIBRATION OF A COORDINATED CONTROL SYSTEM FOR AN ELECTRIC POWER GENERATING STATION

RELATED APPLICATIONS

This application is a continuation-in-part of and incorporates by reference the commonly-owned, U.S. Provisional Application, 60/043,164 filed on Apr. 10, 1997 now abandoned.

FIELD OF THE INVENTION

This invention relates to the field of control systems for electric power generation and, in particular, to expert systems for the self-calibration of an electric power generating plant.

BACKGROUND

In an electric power generating station, a process control unit, or controller, compares values of a process characteristic, or controlled variable, with a target value, or setpoint, to determine whether the process is operating within acceptable bounds. If the controller determines that the controlled variable is outside normal bounds, it can initiate corrective action itself by adjusting a parameter, or manipulated variable, of the process.

A control system as described above is referred to as a feedback system because the value of the manipulated variable is generated in response to the value of the controlled variable. Thus, the controlled variable is fed back into the controller to become one of the inputs to the controller.

In principle, a feedback system can compensate for external disturbances to the extent those disturbances affect the value of the controlled variable which is fed back to the controller. For example, in the case of a heated room, opening the window (an external disturbance) causes a drop in temperature (the controlled variable) which in turn is sensed by the thermostat (the controller). In response, the thermostat increases current flow (manipulated variable) in an effort to re-establish the desired temperature (setpoint). In such a system, the controller responds to the external disturbance indirectly by monitoring any change in the value of the controlled variable.

In many control systems, there can be a delay between the occurrence of the external disturbance and the controlled variable's response to that disturbance. As a result of this delay, the controller may not initiate corrective action promptly. It is possible, in such cases, for the delay to be so long that by the time the controller initiates corrective action, significant damage will have occurred. In such cases, it may be advantageous to sense the disturbance directly rather than through its effect on the controlled variable. If in the heated room of the above example, it were critical that the temperature be held constant, it would be advantageous to provide a signal from the window directly to the thermostat. This connection, from the external disturbance to the controller, is referred to as the feedforward loop of the control system.

A feedforward loop is advantageous because it allows the controller to anticipate the effect of the disturbance on the controlled variable and to thereby compensate for this effect before the effect actually occurs. However, before the controller can do so, it must determine what the effect of the disturbance will be on the control system. In the context of the above example, a thermostat which recognizes that a window has been opened will not necessarily know how much additional current to supply to the heating system. We refer to this information on the effect of a disturbance on the control system as the calibration data.

In the prior art, intervention by a service engineer or other field service personnel is typically required to provide the necessary calibration data to the multivariate controller. Because of the complexity inherent in multivariate control system, reliance on a service engineer can result in error.

What is therefore desirable in the art is a convenient method and system for bypassing human intervention and automatically providing calibration data to the multivariate controller.

SUMMARY

The invention provides for a method of calibrating a multivariate controller in a coordinated control system of an electric power generating station by generating calibration data with an expert system and providing that calibration data to a characterizer block. The calibration data provided to the characterizer block is predictive of the response of the power generating station to an external disturbance. By using this calibration data, the characterizer block can generate a feedforward signal and transmit it to the multivariate controller. The multivariate controller can then, based on this feedforward signal, update the coordinated control system so as to correct for the effect of the disturbance before the effect of the disturbance propagates through the power generating station.

The method of the invention provides for an expert system which operates the power generating station at a pre-selected power output with a stable load. The expert system then loads a plurality of measurements from the power generating station and forms a load array having as many elements as there are measurements. These measurements can include:

a gross megawatt demand, a throttle pressure, a first stage throttle pressure, a turbine valve demand as a percentage of maximum, a total fuel flow as a percentage of a maximum fuel flow, a total air flow as a percentage of maximum airflow, a total feedwater flow rate, a percentage of oxygen, an economizer inlet temperature, a water wall outlet temperature, a primary superheater outlet temperature, a desuperheater outlet temperature, a superheater outlet temperature, a reheat outlet temperature, a boiler master demand as a percentage of maximum, and an LMCC (Load Management Control Center) demand in megawatts In the preferred embodiment, this step of loading data from the power generation system is carried out using a DDE interface between the expert system and power generating station.

The method can also include the step of normalizing one or more elements in the load array by the maximum allowable value of that measurement which corresponds to the element being normalized.

The steps of operating the electric power generating system and loading data measurements can occur repeatedly at different power outputs and under different pressure regimes. Preferably, measurements are obtained in increments of 10% of the total power generating capacity of the power station. Additional measurements can be taken at full pressure with turbine valves wide open, at full pressure with a 75% load, at normal pressure with a 75% load, and at normal reduced pressure with a 75% load.

A pair of selected columns of the table of load arrays formed by the repeated measurements described above is then provided to a selected characterizer block. In the preferred embodiment, this is accomplished by way of a configuration module which generates and executes a collection of scripts whose function is to write the calibration data to a disk file accessible to the characterizer block.

The calibration data provided to the characterizer block can, optionally, be plotted by a graphics module to provide a permanent record of the calibration process.

It is apparent, from the forgoing summary, that the invention provides a method of calibrating the coordinated control system with minimal human intervention and that it does do by replacing the judgment and experience of an expert service engineer with an expert system whose configuration will be better understood with reference to the following description, and the accompanying drawings, in which:

BRIEF DESCRIPTION OF THE FIGURES

FIG. 3 is a section of a spreadsheet after the data loading operation shown in FIG. 2 has been carried out;

FIG. 4 is a section of a spreadsheet showing an implementation of the engineering data module used in FIG. 2;

FIG. 5 is a section of a spreadsheet implementing the calculation module of FIG. 2;

FIGS. 9A and 9B show code used by the data loading module of FIG. 2 for acquiring data; and FIGS. 9C and 9D show code used by the configuration module of FIG. 2 to communicate with the characterizer block.

DETAILED DESCRIPTION

Figure 1:
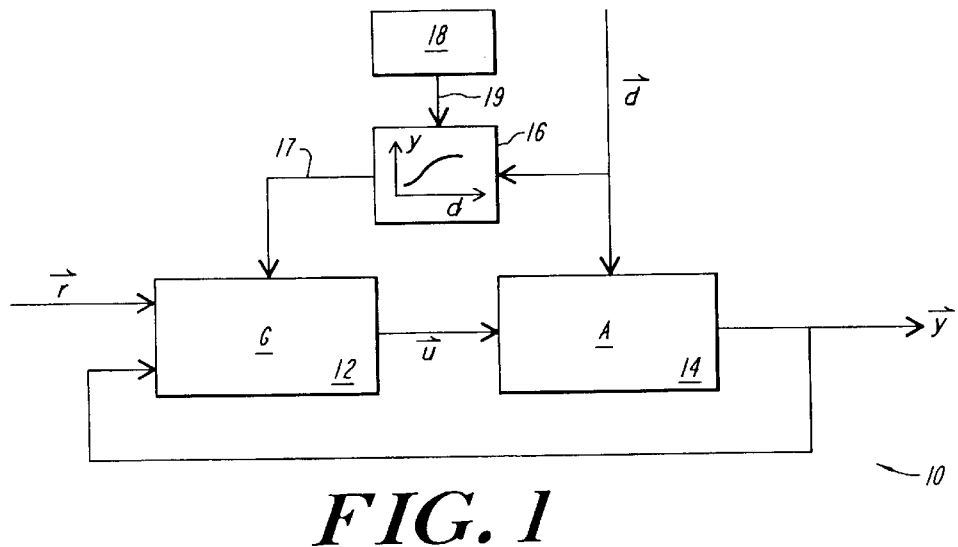
FIG. 1 depicts a control system having a feedforward loop with a characterizer block interposed therein.

Referring to FIG. 1, a simplified diagram of a coordinated control system 10 of an electric power generating station 14 in which the method of the invention can be demonstrated includes a multivariate controller 12 in communication with the electric power generating station 14. The electric power generating station 14, which includes a turbine and boiler, generates controlled variables y in response to both the vector of manipulated variables u generated by the multivariate controller 12 and to a vector of external disturbances d. The measured value of these controlled variables y is then fed back to the multivariate controller 12.

The multivariate controller 12 selects the elements of the vector of manipulated variables u so as to minimize any presently existing error between the vector of measured controlled variables y and a vector of set points r. The elements of the vector of set points correspond to the desired values for the corresponding elements in the vector of controlled variables y.

The multivariate controller 12 also selects the elements of the vector of manipulated variables u so as to compensate for the effect of any external disturbance d on the controlled variables y generated by the electric power generating system 14. This is accomplished by providing one or more characterizer blocks 16 in communication with the multivariate controller 12. Based on the output of an expert system 18 coupled to it, each characterizer block 16 generates feedforward signal 17 which is a prediction of the response of the vector of measured controlled variables y to a specified disturbance.

The process of providing each characterizer block 16 in the coordinated control system 10 with such a predictive model is referred to as calibration. In general, an analytic model of the effect of a disturbance d on the controlled variable's y is difficult to derive. This difficulty arises from mutual coupling between controlled variables and coupling between the controlled variables, the disturbance variables, and the manipulated variables. Consequently, calibration is typically performed by providing a numerical model or table to the characterizer block 16. It is this task that is carried out by the expert system 18.

Figure 2:
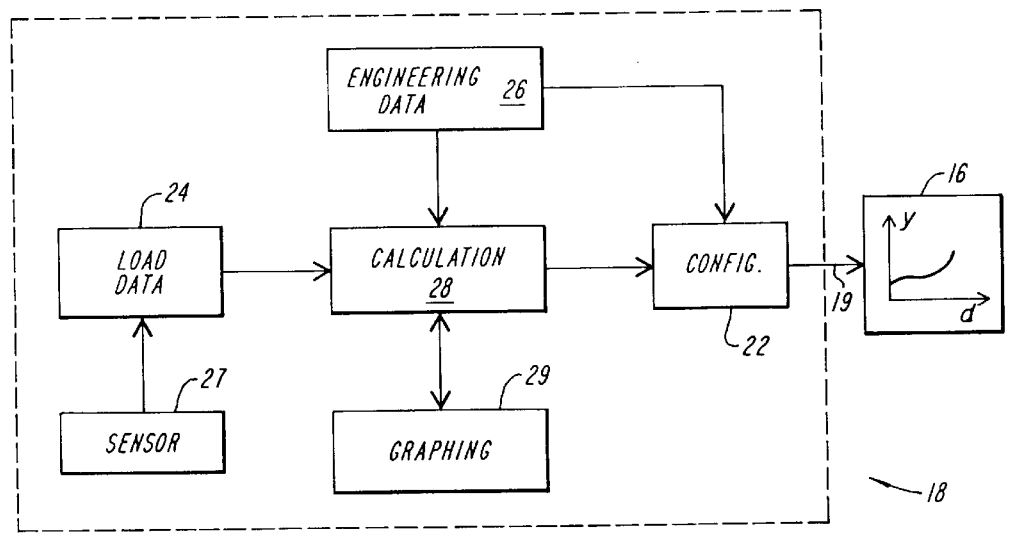
FIG. 2 depicts the structure of software for supplying calibration data to the characterizer block of FIG. 1.
Figure 6:
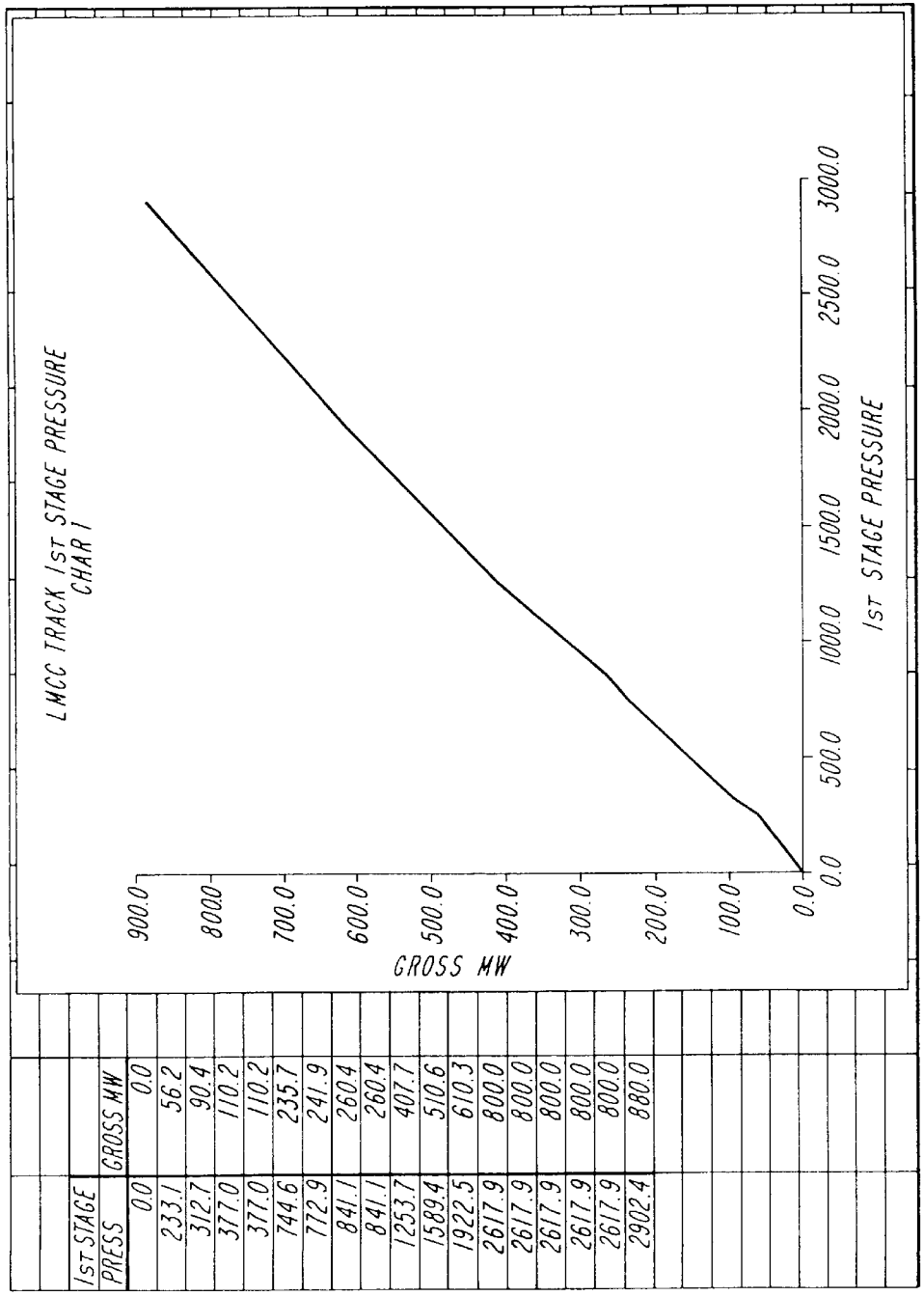
FIG. 6 shows a plot of a selected pair of columns from the spreadsheet of FIG. 5.

Referring to FIG. 2, the expert system 18 includes a data loading module 24 for acquiring real-time data from the electric power generating station 14 during an initial calibration sequence. In the preferred embodiment, the data loading module 24 acquires this data by means of a DDE (Dynamic Data Exchange) interface established between a spreadsheet sold under the trademark "EXCEL" and sensors 27 coupled to the electric power generating station 14. As shown in FIG. 3, which depicts that portion of the spreadsheet implementing the data loading module 24 of the expert system 18, the acquired data includes eighteen load arrays, each of which corresponds to one row of the spreadsheet. Each load array includes:

the gross megawatt demand, the throttle pressure, the first stage throttle pressure, the turbine valve demand as a percentage of maximum, the total fuel flow as a percentage of the maximum fuel flow, the total air flow as a percentage of maximum airflow, the total feedwater flow rate, the percentage of oxygen, the economizer inlet temperature, the water wall outlet temperature, the primary superheater outlet temperature, the desuperheater outlet temperature, the superheater outlet temperature, the reheat outlet temperature, the boiler master demand as a percentage of maximum, and the LMCC (Load Management Control Center) demand in megawatts.

The first five load arrays, namely those associated with load points 1–5, are obtained by increasing the power output in increments of 10% of the maximum power output. For example, for a 500 MW station, the first five load arrays will be taken with power outputs of 50 MW, 100 MW, 150 MW . . . 250 MW. The sixth through the fourteenth load arrays are obtained at full rated throttle pressure. The fifteenth load array is taken at full pressure with turbine valves wide open. The sixteenth load array is taken at full pressure with a 75% load. The seventeenth load array is taken at normal overpressure with a 75% load. The eighteenth load array is taken at normal reduced pressure with 75% load.

Figure 9A:
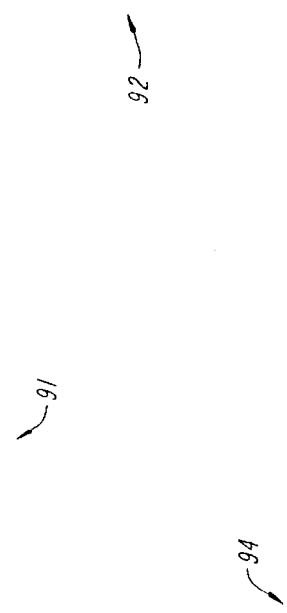

In carrying out the data loading operation, the data loading module executes the instructions shown in FIGS. 9A–9B. Referring to FIG. 9A, the definitions for constants 91 fix the rows and columns to be occupied by the load arrays in the spreadsheet of FIG. 3. The five subroutines 92 are linked to buttons on the spreadsheet and are used to place data in the designated points. Each of the five subroutines executes the "MoveData" routine 93 shown in FIG. 9B to copy selected data and paste it into a selected range of cells. Under normal conditions, load arrays are collected in the order shown on the spreadsheet in FIG. 3, beginning with the load array labeled "1" and ending with the load array labeled "18". The subroutine "Spec_Point" 94 shown in FIG. 9A enables an operator to change the order in which data is collected.

The expert system 18 also includes an engineering data module 26 for storing information which can be pre-loaded rather than having to be acquired in real-time. The engineering data module 26 is implemented in a spreadsheet sold under the trademark "EXCEL" to facilitate communication of this pre-loaded data with the real-time data acquired by the data loading module 24. FIG. 4 shows a portion of an "EXCEL" spreadsheet that implements the engineering data module 26 of the expert system 18. In the preferred embodiment, data pre-loaded into the engineering data module 26 includes allowable ranges for the real-time data acquired by the data loading module 24. For example, the row labeled "First Stage Pressure" in FIG. 4 shows that allowable values of first stage pressure range from 0 to 3000 psig.

The allowable ranges provided by the engineering data module 26 enable the expert system 18 to identify potential malfunctions manifested by real-time values outside the allowable range. These ranges also enable the calculation module 28 of the expert system 18 to normalize the real-time data acquired by the data loading module 24. For example, the calculation module 28, recognizing that the maximum allowable value of feedwater flow is 6000 KPPH (kilo pounds per hour), can normalize a measured feedwater flow of 3000 KPPH to 50%.

As shown in FIG. 4, the engineering data module 26 also includes addresses representative of the characterizer blocks 16. These addresses can be provided to the configuration module 22 of the expert system 18 to enable it to provide the correct characterizer block with the correct data. For example, FIG. 4 shows that the characterizer block labeled "Char 1" has address "3ULD:B8." The engineering data module 26 also includes addresses for the sensors 27 which obtain the measurements loaded by the data loading module 24. For example, FIG. 4 shows that the throttle pressure is obtained from a measurement at address "3CCM:B9.OUT."

Referring again to FIG. 2, the expert system 18 also includes a calculation module 28 which derives calibration data from the data provided by the data loading module 24 and from the engineering data module 26. The calculation module 28 is implemented in as a spreadsheet sold under the trademark "EXCEL" in order to facilitate communication of data between the engineering data module 26 and the data loading module 24. As shown in FIG. 5, a spreadsheet implementing the calculation module 28 imports data from the data loading module 24, and, in some cases, normalizes that data using the allowable ranges specified in the engineering data module 26. For example, in FIG. 5, the column labeled "Total FW Flw %" is derived by dividing each entry in the column labeled "Total FW Flw KPPH" by the maximum allowable feedwater flow of 6000 KPPH, as shown in FIG. 4. The choice of which columns from the portion of the spreadsheet shown in FIG. 3 are to be normalized by the ranges shown in FIG. 4 depends on the specific coordinated control system with which the invention is to be associated.

Figure 7A:
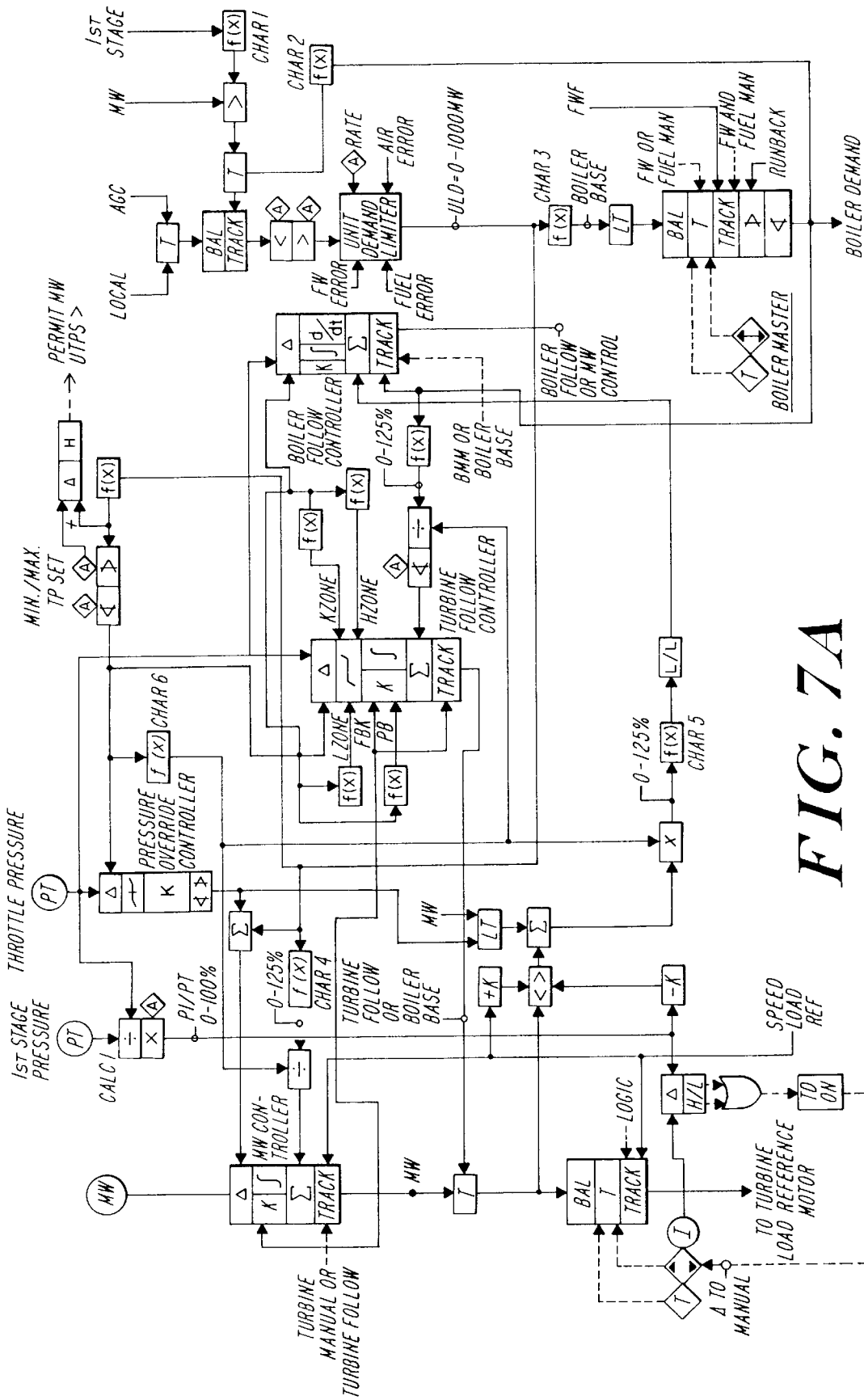
FIGS. 7A and 7B are functional diagrams of a coordinated control system showing the locations of the ten characterizer blocks listed in FIG. 4.
Figure 7B:
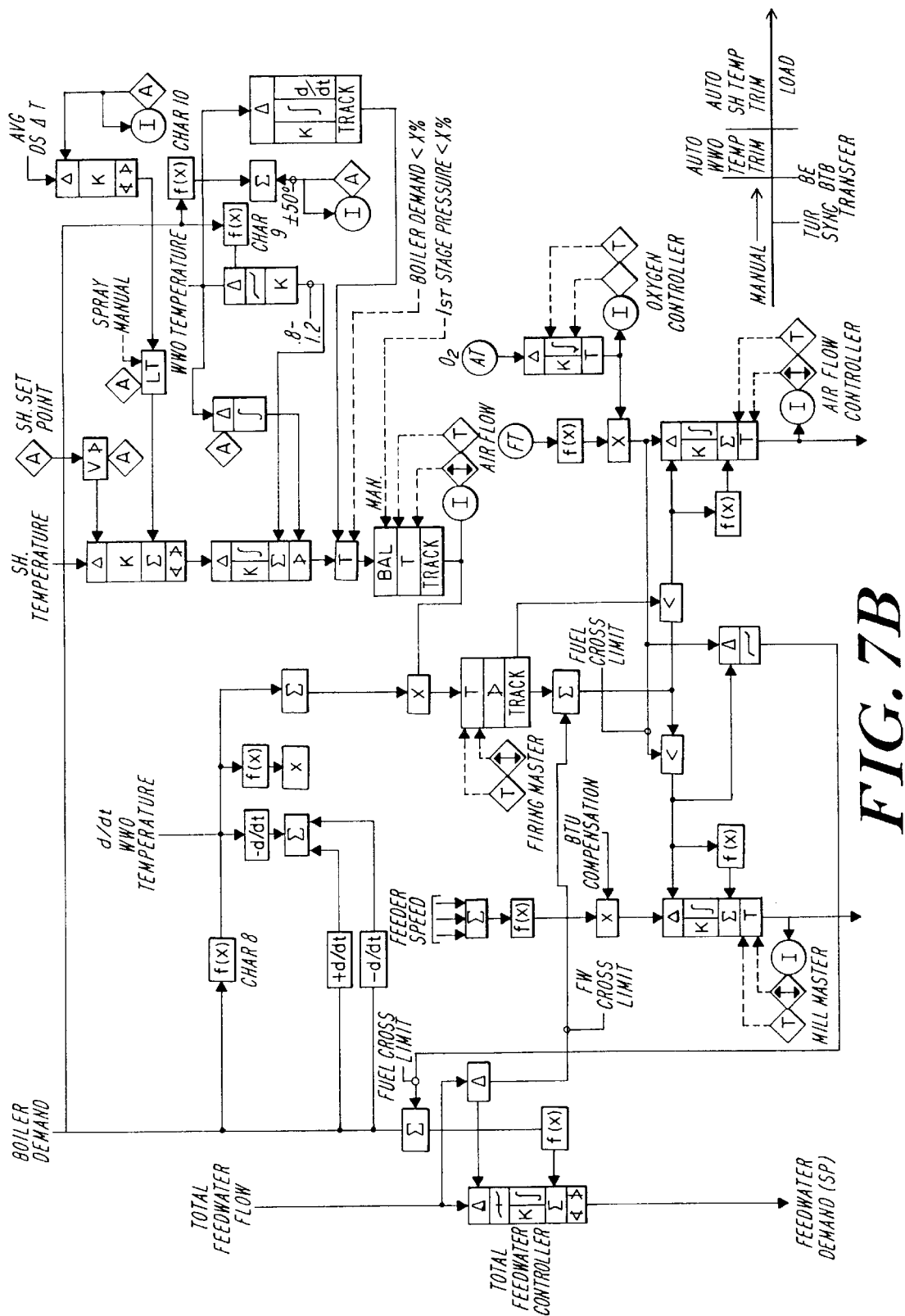

A graphics module 29 linked to the calculation module 28 selects a pair of columns from the spreadsheet shown in FIG. 5 for graphing. This pair of columns forms the calibration data provided to the characterizer block 16. In a system having several characterizer blocks 16, the graphics module 29 selects several pairs of columns from the data provided by the calculation module 28. The choice of which pairs of columns to select for a given characterizer block 16 depends on the characterizer block's function in the control system. For example, in the system whose functional diagram is shown in FIG. 7A, the characterizer block labeled "CHAR 1" accepts first stage throttle pressure at its input and provides a measure of demand at its output. Thus, for "CHAR 1" the selected columns from FIG. 3 are the columns labeled "1st Stg Press PSIG" and "Gross MW." The choice of where to place characterizer blocks 16 and which specific columns from the table generated by the calculation module 28 to assign to each characterizer block 16 depends on the specific coordinated control system with which the calibration system of the invention is to be associated. FIGS. 7A and 7B together show the locations of all ten characterizer blocks listed in FIG. 4 for an illustrative coordinated control system for an electric power generating station. The calibration data provided to each of the ten characterizer blocks shown on FIGS. 7A and 7B is summarized below:

| Characterizer Block | Independent Variable | Dependent Variable |
|---|---|---|
| CHAR 1 | 1st Stage Pressure | Gross MW |
| CHAR 2 | Boiler Demand (%) | Unit Load Demand (MW) |
| CHAR 3 | Unit Load Demand (MW) | Boiler Demand (%) |
| CHAR 4 | Unit Load Demand (MW) | Turbine Valve Demand |
| CHAR 5 | Calculates Turbine Stream Flow (%) | Boiler Demand (%) |
| CHAR 6 | Throttle Pressure Setpoint | Ratio of measured overpressure desired overpressure |
| CHAR 7 | Boiler Demand (%) | Turbine Demand (%) |
| CHAR 8 | Boiler Demand (%) | Firing Demand (%) |

Figure 8:
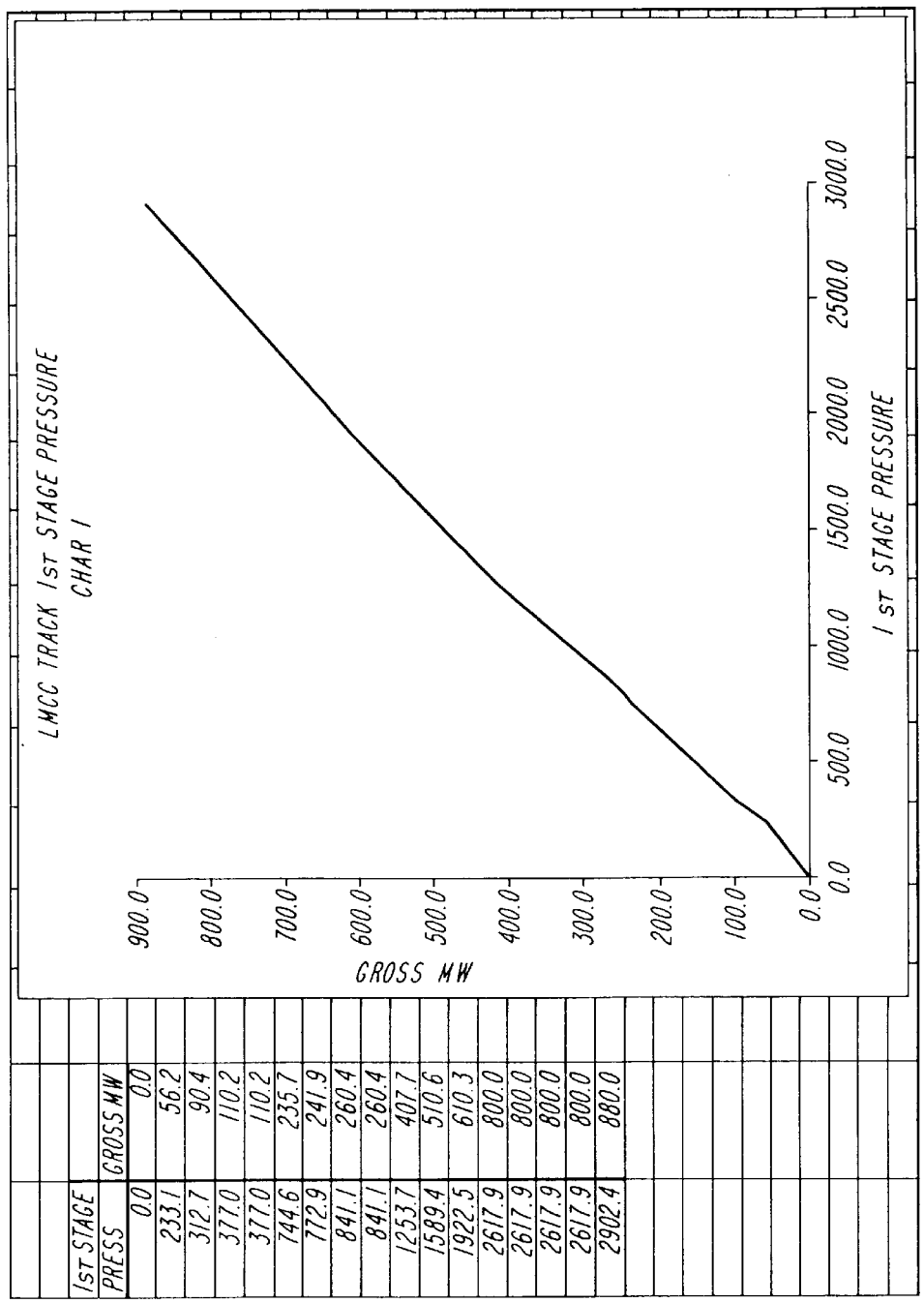
FIG. 8 shows calibration data supplied to one of the characterizer blocks shown in FIG. 7.

FIG. 8 shows a typical plot of calibration data generated by the graphics module 29. The illustrated calibration data, which is to be supplied to "CHAR 1," is plotted with the first stage pressure (in PSIG) as the independent variable and the demand (in megawatts) as the dependent variable.

The process of communicating the calibration data generated by the calculation module 28 to the characterizer block 16 is carried out by a configuration module 22 which, as shown in FIG. 2, accesses addresses representative of the characterizer block from the engineering data module 26 and calibration data from the calculation module 28. In the preferred embodiment, the configuration module 28 provides references to Visual Basic code to automatically build API (Application Program Interface) script files. Each script file is a series of commands used by the IccAPI to update the calibration curve in each characterizer block.

The configuration module 22 of the preferred embodiment executes the instructions shown in FIGS. 9C and 9D. Subroutine "GetChars" 96 opens a file named "icc.scr" and places into it information regarding the characterizer block and the calibration data provided to that characterizer block. The calibration data is written through repeated calls in "GetChars" 96 to the subroutine "WriteScript" 97.

It will thus be seen that the invention efficiently attains the objects set forth above. Since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all generic and specific features of the invention described herein, and all statements of the scope of the invention which as a matter of language might be said to fall there between.

Having described the invention, what is claimed as new and secured by Letters Patent is:

1. A method of calibrating a multivariate controller for a coordinated control system of an electric power generating station, the multivariate controller being responsive to a disturbance variable and generating a manipulated variable for controlling a response of the power generating station, the method comprising the steps of generating, by means of a computer-implemented expert system, calibration data predictive of the response of the power generating station to the disturbance variable, forming a feedforward signal based upon the disturbance variable and the calibration data, and updating the coordinated control system based upon the feedforward signal before the disturbance propagates through the power generating station.

2. The method of claim 1 further comprising the step of implementing the expert system as a computer-implemented spreadsheet.

3. The method of claim 1 wherein the step of generating the calibration data comprises the steps of operating the power generating station at a pre-selected power output with a stable load, and loading, into the expert system, a plurality of selected data measurements from the electric power generating station operating at the pre-selected power output, thereby forming a load array having a plurality of elements, each of which corresponds to one of the selected data measurements.

4. The method of claim 3 further comprising the steps of specifying a maximum allowable value for a selected element of the load array, and normalizing the selected element of the load array by the maximum allowable value.

5. The method of claim 3 wherein the step of loading the plurality of data measurements includes the step of providing a DDE interface between the expert system and the power generating station.

6. The method of claim 3 further comprising the step of selecting the selected data measurements to include a measurement selected from a group consisting of:

a gross megawatt demand, a throttle pressure, a first stage throttle pressure, a turbine valve demand as a percentage of maximum, a total fuel flow as a percentage of a maximum fuel flow, a total air flow as a percentage of maximum airflow, a total feedwater flow rate, a percentage of oxygen, an economizer inlet temperature, a water wall outlet temperature, a primary superheater outlet temperature, a desuperheater outlet temperature, a superheater outlet temperature, a reheat outlet temperature, a boiler master demand as a percentage of maximum, and an LMCC (Load Management Control Center) demand in megawatts.

7. The method of claim 3 wherein the operating and loading steps are repeated at each of a plurality of pre-selected power outputs.

8. The method of claim 3 further comprising the step of selecting the stable load to be a 75% load.

9. The method of claim 8 further comprising the steps of performing the operating and loading steps at full pressure, performing the operating and loading steps at full pressure with turbine valves wide open, performing the operating and loading steps at normal overpressure, and performing the operating and loading steps at normal reduced pressure.

10. The method of claim 1 wherein the step of forming a feedforward signal comprises the step of communicating the calibration data to the characterizer block, thereby providing the characterizer block with a predictive model of the response of the power generating station to the disturbance variable.

11. The method of claim 10 further comprising the step of providing the expert system with an interface to the characterizer block for communication of the calibration data to the characterizer block.

12. The method of claim 11 wherein the step of providing the expert system with an interface to the characterizer block comprises the step of writing an interfacing file to a disk accessible to the characterizer block, the interfacing file including the calibration data.

13. The method of claim 11 further comprising the step of selecting a characterizer block with which to communicate the calibration data.

14. The method of claim 1 further comprising the step of plotting the calibration data.

15. An apparatus for calibrating a multivariate controller in a coordinated control system of an electric power generating station subject to an external disturbance, the apparatus comprising a multivariate controller, a computer-implemented expert system for generating calibration data predictive of the response of the electric power generating station to the external disturbance, and a characterizer block coupled to the expert system and to the coordinated control system, the characterizer block generating a feedforward signal based upon the external disturbance and providing the feedforward signal to the multivariate controller such that the multivariate controller reacts to the external disturbance before the disturbance propagates through the electric power generating station.

16. The apparatus of claim 15 wherein the expert system is implemented as a computer-implemented spreadsheet.

17. The apparatus of claim 15 wherein the expert system comprises operating means for operating the power generating station at a pre-selected power output with a stable load, and loading means for acquiring a plurality of selected data measurements from the electric power generating station operating at the pre-selected power output, thereby forming a load array having a plurality of elements, each of which corresponds to one of the selected data measurements.

18. The apparatus of claim 17 further comprising ranging means for specifying a maximum allowable value for a selected element of the load array, and scaling means for normalizing the selected element of the load array by the maximum allowable value.

19. The apparatus of claim 17 wherein the loading means comprises a DDE interface between the expert system and the power generating station.

20. The apparatus of claim 17 wherein the loading means comprises measurement means for selecting the selected data measurements to include a measurement selected from a group consisting of:

a gross megawatt demand, a throttle pressure, a first stage throttle pressure, a turbine valve demand as a percentage of maximum, a total fuel flow as a percentage of a maximum fuel flow, a total air flow as a percentage of maximum airflow, a total feedwater flow rate, a percentage of oxygen, an economizer inlet temperature, a water wall outlet temperature, a primary superheater outlet temperature, a desuperheater outlet temperature, a superheater outlet temperature, a reheat outlet temperature, a boiler master demand as a percentage of maximum, and an LMCC (Load Management Control Center) demand in megawatts.

21. The apparatus of claim 17 wherein the operating and loading means are configured to operate the power generating system and acquire data at each of a plurality of pre-selected power outputs.

22. The apparatus of claim 17 wherein the operating means if configured to operate with a stable 75% load.

23. The apparatus of claim 22 further comprising means for performing the operating and loading steps at full pressure, means for performing the operating and loading steps at full pressure with turbine valves wide open, means for performing the operating and loading steps at normal overpressure, and means for performing the operating and loading steps at normal reduced pressure.

24. The apparatus of claim 15 further comprising communication means for communicating the calibration data from the expert system to the characterizer block, thereby providing the characterizer block with a predictive model of the response of the power generating station to the disturbance variable.

25. The apparatus of claim 24 wherein the communication means comprises a software interface to the characterizer block for communication of the calibration data to the characterizer block.

26. The apparatus of claim 25 further comprising script generating means for writing an interfacing file to a disk accessible to the characterizer block, the interfacing file including the calibration data.

27. The apparatus of claim 25 further means for selecting a characterizer block with which to communicate the calibration data.

28. The apparatus of claim 15 further comprising graphics means for plotting the calibration data.

29. A computer-readable medium having, encoded thereon, software for calibrating a multivariate controller for a coordinated control system of an electric power generating station, the multivariate controller being responsive to a disturbance variable and generating a manipulated variable for controlling a response of the power generating station, the software comprising instructions for executing the steps of generating, by means of a computer-implemented expert system, calibration data predictive of the response of the power generating station to the disturbance variable, forming a feedforward signal based upon the disturbance variable and the calibration data, and updating the coordinated control system based upon the feedforward signal before the disturbance propagates through the power generating station.

* * * * *